(12) United States Patent
Likas et al.

(10) Patent No.: US 7,925,555 B2
(45) Date of Patent: Apr. 12, 2011

(54) MASTER SYSTEM OF RECORD

(75) Inventors: John Likas, San Rafael, CA (US); Alan W. Hecht, Chanhassen, MN (US); Arlyn C. Schaible, Lakeville, MN (US); Robert Scot Thomas, Monticello, MN (US)

(73) Assignee: Wells Fargo Bank N.A., San Francisco, CA (US)

( * ) Notice: Subject to any disclaimer, the term of this patent is extended or adjusted under 35 U.S.C. 154(b) by 1190 days.

(21) Appl. No.: 10/703,225

(22) Filed: Nov. 5, 2003

(65) Prior Publication Data

US 2005/0097035 A1    May 5, 2005

(51) Int. Cl.
*G06Q 40/00* (2006.01)

(52) U.S. Cl. .......................................................... 705/35

(58) Field of Classification Search .................... 705/39, 705/42, 35
See application file for complete search history.

(56) References Cited

U.S. PATENT DOCUMENTS

| | | | | |
|---|---|---|---|---|
| 5,120,944 | A | | 6/1992 | Kern ............................... 235/379 |
| 5,168,444 | A | * | 12/1992 | Cukor et al. ...................... 705/1 |
| 5,187,750 | A | | 2/1993 | Behera ............................. 387/7 |
| 5,206,915 | A | | 4/1993 | Kern et al. ......................... 382/7 |
| 5,221,830 | A | | 6/1993 | Kern ............................... 235/379 |
| 5,237,158 | A | | 8/1993 | Kern et al. ....................... 235/379 |
| 5,237,159 | A | * | 8/1993 | Stephens et al. ................ 705/30 |
| 5,349,170 | A | | 9/1994 | Kern ............................... 235/379 |
| 5,373,550 | A | | 12/1994 | Campbell et al. ............. 379/100 |
| 5,631,984 | A | | 5/1997 | Graf ............................... 382/317 |
| 5,668,897 | A | | 9/1997 | Stolfo ............................. 382/283 |
| 5,708,810 | A | | 1/1998 | Kern ............................... 395/712 |
| 5,748,780 | A | | 5/1998 | Stolfa ............................. 382/232 |
| 5,754,673 | A | | 5/1998 | Brooks et al. .................. 382/112 |
| 5,783,808 | A | * | 7/1998 | Josephson ...................... 235/379 |
| 5,784,610 | A | | 7/1998 | Copeland ....................... 395/615 |
| 5,812,989 | A | | 9/1998 | Witt et al. ......................... 705/45 |
| 5,870,725 | A | * | 2/1999 | Bellinger et al. ................ 705/45 |
| 5,874,717 | A | | 2/1999 | Kern et al. ...................... 235/379 |
| 5,895,455 | A | | 4/1999 | Bellinger et al. ................ 705/35 |
| 5,917,965 | A | * | 6/1999 | Cahill et al. .................... 382/305 |
| 5,940,844 | A | | 8/1999 | Cahill et al. .................... 707/526 |
| 6,115,509 | A | | 9/2000 | Yeskel ............................ 382/309 |
| 6,125,196 | A | * | 9/2000 | Carey et al. .................... 382/138 |

(Continued)

FOREIGN PATENT DOCUMENTS

EP          658042          6/1995

(Continued)

OTHER PUBLICATIONS

Business Editors/High-Tech Writers, "CheckWorks Expands its Image Archive and Distribution Solutions in Response to Market Endorsement and Growing Customer Base", Business Wire, Sep. 22, 2003.*

(Continued)

*Primary Examiner* — James A Kramer
*Assistant Examiner* — Eric T Wong
(74) *Attorney, Agent, or Firm* — Merchant & Gould P.C.

(57) ABSTRACT

A method and apparatus containing a single master system of record that provides a record of all paper and electronic transactions during a predetermined period of time, that provides capability for directing the retrieval of images stored in multiple and distributed owned and un-owned archives, and that provides a link to all assisting transaction informational data and images, e.g. e-signature, pictures, and handwriting is provided.

22 Claims, 10 Drawing Sheets

U.S. PATENT DOCUMENTS

| | | |
|---|---|---|
| 6,181,837 B1 | 1/2001 | Cahill et al. ............... 382/305 |
| 6,192,165 B1 * | 2/2001 | Irons ........................ 382/306 |
| 2002/0029190 A1 * | 3/2002 | Gutierrez-Sheris ............ 705/39 |
| 2002/0138490 A1 | 9/2002 | Schulze et al. |
| 2004/0034550 A1 * | 2/2004 | Menschik et al. ............. 705/3 |
| 2004/0158832 A1 * | 8/2004 | Chechik et al. ............. 718/102 |

FOREIGN PATENT DOCUMENTS

| | | |
|---|---|---|
| EP | 661655 | 7/1995 |
| EP | 671696 | 9/1995 |
| EP | 675452 | 10/1995 |
| EP | 482116 | 2/1998 |
| EP | 984410 | 3/2000 |

OTHER PUBLICATIONS

A. Koerich, Montreal, Canada; L. Lee, Campinas, Brazil; *Automatic Storage, Retrieval and Visualization of Bank Check Images*.

T. Westerveld; *Image Retrieval: Content versus Context*; T.;University of Twente, Department of Computer Science, Parlevink Group, The Netherlands.

S. Dey; *Adding Feedback to Improve Segmentation and Recognition of Handwritten Numerals*; Massachusetts Institute of Technology, Department of Electrical Engineering and Computer Science; May 1999.

A. Agarwal, K. Hussein, A. Gupta, P.S.P. Wang; *Detection of Courtesy Amount Block on Bank Checks*.

May 18, 2009—International Preliminary Examination Report for International Application No. PCT/US04/36928, 6 pages.

* cited by examiner

Figure 8

```
                RE7.HUB_FILE_CNTL
Column Name            ColNo Datatyp Length
---1----v----2----v----3----v----4----v
HUBF_CLUSTER_NBR        1 SMALLINT
HUBF_HUB_NBR            2 SMALLINT
HUBF_CAPTR_LOC          3 SMALLINT
HUBF_PCD_EVNT_NM        4 CHAR          8
HUBF_PCD_SEQ_NBR        5 CHAR          8
HUBF_PROCESS_TYPE       6 CHAR          8
HUBF_ENTRY_NAME         6 CHAR          1
HUBF_ENTRY_TYPE         7 CHAR          4
HUBF_FILE_B_UNIT_N      8 INTEGER       4
HUBF_FILE_E_UNIT_N      9 INTEGER       4
HUBF_CR_AMT            10 DECIMAL     13,2
HUBF_DR_AMT            11 DECIMAL     13,2
HUBF_CR_COUNT          12 DECIMAL      11
HUBF_DR_COUNT          13 DECIMAL      11
HUBF_IMAGE_COUNT       14 DECIMAL      11
HUBF_VALID_FILE_FLAG   15 CHAR          1

PRIMARY INDEX
HUBF_CLUSTER_NBR       ASC
HUBF_HUB_NBR           ASC
HUBF_CAPTR_LOC         ASC
HUBF_ENTRY_NAME        ASC
```

```
                RE7.CNTL
Column Name            ColNo Datatyp Length
---1----v----2----v----3----v----4----v
CNTL_CLUSTER_NBR        1 SMALLINT
CNTL_ITM_CAPTR_DT       2 DATE          4
CNTL_ACCESS_LOC         3 CHAR          2
CNTL_LST_LD_TS          4 TIMESTMP     10
CNTL_DATABASE_NM        5 CHAR          8
CNTL_TABLESPACE_NM      6 DECIMAL       3
CNTL_COLLECTION_ID      7 CHAR          8

PRIMARY INDEX
CNTL_ITM_CAPTR_DT      ASC
CNTL_CLUSTER_NBR       ASC
```

```
                RE7.BXRF_BNK_XREF
Column Name            ColNo Datatyp Length
---1----v----2----v----3----v----4----v
BXRF_CO_ID              1 SMALLINT
BXRF_CAPTR_LOC          2 INTEGER       4
BXRF_BNK_NM             3 CHAR         30
BXRF_R_T_NBR            4 INTEGER       4
BXRF_BNK_HUB_ID         5 SMALLINT
BXRF_SITE               6 CHAR          2

PRIMARY INDEX
BXRF_R_T_NBR           ASC
BXRF_CO_ID             ASC
```

```
                RE7.HUB_CNTL
Column Name            ColNo Datatyp Length
---1----v----2----v----3----v----4----v
HUBC_HUB_NBR            1 SMALLINT
HUBC_HUB_SEQUENCE       2 CHAR          1
HUBC_ITEM_CAPTR_DATE    3 DATE
HUBC_HUB_AVAILABLE      4 CHAR          1
HUBC_DATABASE_NM        5 CHAR          8
HUBC_TBLSPCE_NBR        6 DECIMAL       3
HUBC_COLLECTION_ID      7 CHAR          8
HUBC_UNIT_NBR_BEG       8 INTEGER       4
HUBC_UNIT_NBR_END       9 INTEGER
4
PRIMARY INDEX
HUBC_HUB_NBR           ASC
HUBC_HUB_SEQUENCE      ASC
```

Figure 9

This table occurs once for each day for 5 days and once per week for 7 years and for each hub

| RE7nxxx.CITM_CAPTR_ITM | | | |
|---|---|---|---|
| Column Name | ColNo | Datatyp | Length |
| CITM_CLUSTER_NBR | 1 | SMALLINT | |
| CITM_ACCT_NBR | 2 | CHAR | 17 |
| CITM_UNIT_NBR | 3 | INTEGER | 4 |
| CITM_UNIT_NBR_SEQ | 4 | INTEGER | 4 |
| CITM_CO_ID | 5 | SMALLINT | |
| CITM_PRDCT_CD | 6 | CHAR | 3 |
| CITM_AMT | 7 | DECIMAL | 15,2 |
| CITM_DR_CR_IND | 8 | CHAR | 1 |
| CITM_SPCL_IND | 9 | CHAR | 1 |
| CITM_SOW_AU | 10 | DECIMAL | 5 |
| CITM_ABA_NBR | 11 | CHAR | 8 |
| CITM_DEST_APPL | 12 | CHAR | 2 |
| CITM_CAPTR_LOC | 13 | INTEGER | 4 |
| CITM_ITM_REF_NBR | 14 | DECIMAL | 13 |
| CITM_ITM_REF_SEQ | 15 | INTEGER | 4 |
| CITM_REC_TYPE_IND | 16 | CHAR | 2 |
| CITM_SERIAL_NBR | 17 | CHAR | 15 |
| CITM_SRC_CD | 18 | CHAR | 2 |
| CITM_TRAN_CD | 19 | INTEGER | 4 |
| CITM_APPL_TRAN_CD | 20 | INTEGER | 4 |
| CITM_ECCHO_IND | 21 | CHAR | 1 |
| CITM_IMAGE_IND | 22 | CHAR | 1 |
| CITM_PAPER_IND | 23 | CHAR | 1 |
| CITM_DW_ATM_ID | 24 | CHAR | 6 |
| CITM_DW_DESC | 25 | VARCHAR | 256 |

```
PRIMARY INDEX
CITM_CLUSTER_NBR    ASC
CITM_ACCT_NBR       ASC
CITM_UNIT_NBR       ASC
CITM_UNIT_NBR_SEQ   ASC

SECONDARY INDEXES
CITM_CLUSTER_NBR    ASC
CITM_ITM_REF_NBR    ASC
CITM_ITM_REF_SEQ    ASC

CITM_CLUSTER_NBR    ASC
CITM_AMT            ASC
CITM_ACCT_NBR       ASC
CITM_ABA_NBR        ASC

CITM_CLUSTER_NBR    ASC
CITM_UNIT_NBR       ASC
CITM_UNIT_NBR_SEQ   ASC
CITM_DR_CR_IND      ASC
```

This table occurs once for each day for 5 days and once per week for 7 years and for each hub

| RE7nxxx.CIBL_CAPTR_ITM_BAL | | | |
|---|---|---|---|
| Column Name | ColNo | Datatyp | Length |
| CIBL_CLUSTER_NBR | 1 | SMALLINT | |
| CIBL_UNIT_NBR | 2 | INTEGER | 4 |

This table occurs once for each day for 5 days and once per week for 7 years and for each hub

| RE7nxxx.SPIN_SPCL_ITM_IND | | | |
|---|---|---|---|
| Column Name | ColNo | Datatyp | Length |
| SPIN_CLUSTER_NBR | 1 | SMALLINT | |
| SPIN_UNIT_NBR | 2 | INTEGER | 4 |
| SPIN_UNIT_NBR_SEQ | 3 | INTEGER | 4 |
| SPIN_OUTGNG_RTN | 4 | CHAR | |
| SPIN_UPI_IND | 5 | SMALLINT | 3 |
| SPIN_AS_OF_DT | 6 | DATE | |
| SPIN_ADJ_IND | 7 | CHAR | 1 |
| SPIN_HOLDOVER_IND | 8 | CHAR | 1 |
| SPIN_MICR_POS_44 | 9 | CHAR | 1 |

```
PRIMARY INDEX
SPIN_CLUSTER_NBR    ASC
SPIN_UNIT_NBR       ASC
SPIN_UNIT_NBR_SEQ   ASC
```

Figure 10

This table occurs once for each day for 5 days and once per week for 7 years and for each hub

RE7nxxx.ILOC_IMAGE_LOCATOR

| Column Name | ColNo | Datatyp | Length |
|---|---|---|---|
| ILOC_CAPTR_LOC | 1 | INTEGER | 4 |
| ILOC_ITM_REF_NB | 2 | DECIMAL | 13 |
| ILOC_CLUSTER_NBR | 3 | INTEGER | 4 |
| ILOC_DOCUMENT_TYPE | 4 | CHAR | 1 |
| ILOC_IMAGE_TYPE | 5 | CHAR | 3 |
| ILOC_IRB_ADAPTOR_NBR | 6 | CHAR | 3 |
| ILOC_IMAGE_KEY | 7 | VARCHAR | 256 |

PRIMARY INDEX --

| ILOC_CAPTR_LOC | ASC |
| ILOC_ITM_REF_NBR | ASC |
| ILOC_CLUSTER_NBR | ASC |

RE7.EVNTC_EVNT_CTRL

| Column Name | ColNo | Datatyp | Length |
|---|---|---|---|
| EVNTC_ITM_CAPTR_DT | 1 | DATE | 4 |
| EVNTC_CAPTR_LOC | 2 | INTEGER | 4 |
| EVNTC_EVNT_NM | 3 | CHAR | 8 |
| EVNTC_SEQ_NBR | 4 | SMALLINT | 2 |
| EVNTC_STATUS | 5 | CHAR | 2 |
| EVNTC_READY_TS | 6 | TIMESTMP | 10 |
| EVNTC_START_TS | 7 | TIMESTMP | 10 |
| EVNTC_END_TS | 8 | TIMESTMP | 10 |

PRIMARY INDEX

EVNTC_ITM_CAPTR_DT
EVNTC_CAPTR_LOC
EVNTC_EVNT_NM
EVNTC_SEQ_NBR

This table occurs once for each day for 5 days and once per week for 7 years and for each hub

RE7nxxx.TXRF_TRACEID_XREF

| Column Name | ColNo | Datatyp | Length |
|---|---|---|---|
| TXRF_CAPTR_LOC | 1 | INTEGER | 4 |
| TXRF_ITM_REF_NBR | 2 | DECIMAL | 13 |
| TXRF_CLUSTER_NBR | 3 | INTEGER | 4 |
| TXRF_CAPTR_LOC_XREF | 4 | INTEGER | 4 |
| TXRF_ITM_REF_NBR_XREF | 5 | DECIMAL | 13 |
| TXRF_CLUSTER_NBR_XREF | 6 | INTEGER | 4 |

PRIMARY INDEX --

| TXRF_CAPTR_LOC_XREF | ASC |
| TXRF_ITM_REF_NBR_XREF | ASC |
| TXRF_CLUSTER_NBR_XREF | ASC |

SECONDARY INDEX

| TXRF_CAPTR_LOC_XREF | ASC |
| TXRF_ITM_REF_NBR_XREF | ASC |
| TXRF_CLUSTER_NBR_XREF | ASC |

RE7.AUDT_AUDIT

| Column Name | ColNo | Datatyp | Length |
|---|---|---|---|
| AUDT_START_TS | 1 | TIMESTMP | 10 |
| AUDT_STOP_TS | 2 | TIMESTMP | 10 |
| AUDT_ORIG_AU | 3 | CHAR | 6 |
| AUDT_USER_ID | 4 | CHAR | 8 |
| AUDT_CLIENT_APP_ID | 5 | CHAR | 2 |
| AUDT_NBR_ITEMS_RET | 6 | SMALLINT | |
| AUDT_BEG_DT | 7 | CHAR | 10 |
| AUDT_END_DT | 8 | CHAR | 10 |
| AUDT_LAST_DT_ACC | 9 | CHAR | 10 |
| AUDT_TRANS_TYPE | 10 | CHAR | 2 |
| AUDT_ONL_BTCH_IND | 11 | CHAR | 1 |
| AUDT_ERROR_CD | 12 | CHAR | 5 |
| AUDT_ERROR_MSG | 13 | CHAR | 70 |

PRIMARY INDEX

AUDT_STOP_TS

This table occurs once for each day for 5 days and once per week for 7 years

RE7nxxx.RITM_RT_HISTORY

| Column Name | ColNo | Datatyp | Length |
|---|---|---|---|
| RITM_CLUSTER_NBR | 1 | SMALLINT | |
| RITM_DEP_BANK | 2 | DECIMAL(5) | |
| RITM_DEP_APPL | 3 | CHAR (3) | |
| RITM_DEP_ACCT | 4 | DECIMAL(17) | |
| RITM_DEP_STORE | 5 | DECIMAL(10) | |
| RITM_DEP_DATE | 6 | DATE | |
| RITM_DR_SOURCE | 7 | INTEGER | |
| RITM_DR_SEQ | 8 | DECIMAL(13) | |
| RITM_CR_SOURCE | 9 | INTEGER | |
| RITM_CR_SEQ | 10 | DECIMAL(12) | |
| RITM_DEP_NAME | 11 | CHAR(40) | |
| RITM_CHG_BANK | 12 | DECIMAL(9,0) | |
| RITM_CHG_APPL | 13 | CHAR(3) | |
| RITM_ACCT | 14 | ECIMAL(17,0) | |
| RITM_CAP_SITE | 15 | CHAR(08) | |
| RITM_RET_CAP_SRC | 16 | INTEGER | |
| RITM_RET_CAP_SEQ | 17 | DECIMAL(13) | |
| RITM_MAKER_SERL | 18 | DECIMAL(10) | |
| RITM_MAKER_RT | 19 | DECIMAL(8) | |
| RITM_MAKER_ACCT | 20 | DECIMAL(17) | |
| RITM_MAKER_TRAN | 21 | DECIMAL(6) | |
| RITM_MAKER_AMT | 22 | ECIMAL(13,2) | |
| RITM_MAKER_NAME | 23 | CHAR(25) | |
| RITM_CLID | 24 | CHAR(18) | |
| RITM_REASON | 25 | CHAR(3) | |
| RITM_REASON_DESC | 26 | CHAR(30) | |
| RITM_DECISION | 27 | CHAR(3) | |
| RITM_DECISION_DESC | 28 | CHAR(12) | |
| RITM_IMAGE_IND | 29 | CHAR(1) | |
| RITM_PROC_DATE | 30 | DATE | |
| RITM_DEP_DATE | 31 | DATE | |

PRIMARY INDEX

| RITM_MAKER_ACCOUNT | ASC |
| RITM_MAKER_AMOUNT | ASC |
| RITM_MAKER_RT_NBR | ASC |
| RITM_MAKER_SERIAL_NBR | ASC |

MASTER SYSTEM OF RECORD

BACKGROUND OF THE INVENTION

1. Technical Field

The invention relates generally to transactions systems. More particularly, the invention relates to an all transactions relational data base carrying access and linking keys to multiple image archives and databases.

2. Description of the Prior Art

Financial institutions are generally required to maintain archives of financial documents and related data for several years. Further, many financial institutions find themselves in the situation where they need to keep up with the times with respect to the deployment of newer technologies, such as image technology. In practice, the deployment of image technology can involve billions of document images typically stored in check archives. Also, those institutions committed to such technical deployment find themselves financially committed in the range of up to several hundred million dollars. Therefore, because the deployment of new technology for financial institutions is a huge and expensive endeavor, such institutions are highly motivated to recoup their former investments and efforts in earlier technologies. In addition, financial institutions find that many customers are attracted to products based on new technology, such as image-based products. The use of a computer-based image processing system or image capture platform to scan documents, such as checks and the like, and to then digitally store the results on storage devices is generally known in the art, as follows:

John Ray Copeland, III, Leslie Marie Doby, Larry Page Hobbs, Jr., Vil Patrick Johnikin, Julie Ann Pridmore, Sterling Richardson Smith, Thomas Chester Smith, Lori London Weaver, and Filip Jay Yeskel, Check Image Distribution and Processing System and Method, U.S. Pat. No. 5,784,610 (Jul. 21, 1998) disclose a digital document image archive and distribution system that includes an archive system and a distributed digital document image retrieval system. The system has communication nodes located at an image capture site and at one or more remote archive retrieval sites, these sites forming a communications network operating as a chained client/server network composed of workstation components and a capture site host computer component. An originating remote workstation retrieves a digital document image from the image capture site by creating a transaction file that identifies a digital document image to be retrieved. This transaction file is sent to a remote server workstation whereat a plurality of transaction files are batched by priority. The batched transaction files are transmitted to the capture site workstation whereat the host component retrieves a group of digital document images from archive storage, including the digital document image that is identified by the transaction file. The host then sends the group of digital document images to a capture site server workstation, which workstation then sends the group of digital document images from the capture site server workstation to the remote server workstation, whereupon the group of digital document images is sent from the remote server workstation to the originating remote workstation. A visual display is then used to image process the group of digital document images at the originating remote workstation.

David T. Bellinger and Isabelle R. Moss, High Volume Financial Image Media Creation and Display System and Method, U.S. Pat. No. 5,870,725 (Feb. 9, 1999) disclose an apparatus and method for high volume, and high speed, financial image creation and manipulation. Images of cleared checks are captured and combined with MICR data and customer supplied account history. A customer additional data field is incorporated to facilitate searching and retrieval of checks and electronic transactions. Check images are delivered in multiple media, e.g. CD-ROM, microfilm, as preselected by bank customer. An image workstation allows customers to relate specific issue data to paid check data captured by the bank. Cumulative transaction item index covers multiple accounting periods. Front and back of image of cleared checks can be manipulated on screen, and exported to other applications. Graphical user interface trilogy of screens—search, results, and display, facilitate usage by customer.

Thomas Cahill, John J. McMonagle, Richard H. Sferra, Glenn Levine, Saul Goldfisher, and PhilipWilson, Method And Apparatus For Storing Images Of Documents Having Magnetic Ink Code Line, U.S. Pat. No. 5,917,965 (Jun. 29, 1999) disclose a method and apparatus for storing and retrieving images of documents, e.g. checks. The method comprises placing a plurality of documents in a document imaging machine and forming an electronic image of each document, storing each electronic image in an electronic storage device, providing at least one user interface device in communication on a communication link with the electronic storage device, placing a request for at least one document image on the user interface device, transmitting the request by the communication link to the electronic storage device, searching the electronic storage device for the requested electronic image of the document, retrieving the at least one electronic image or providing an indication that the image was not found, storing the electronic image, if found, in an electronic file, for transmission to the user interface device at user option, providing the electronic image to the user interface device at command of a user at the user interface device for storage at the user interface device and displaying the requested electronic image on a display of the User interface device. Preferably, the electronic, images are stored with embedded identifying information in a TIFF® (trademark of Aldus Corp.) file format and the check images can be displayed on a display device which permits the user to view both sides of the checks simultaneously and perform functions such as zooming and rotation of the images.

Thomas Cahill, John J. McMonagle, and Richard H. Sferra, Method and Apparatus for Displaying Electronic Image of a Check, U.S. Pat. No. 5,940,844 (Aug. 17, 1999) disclose a method and apparatus for storing and retrieving images of documents, e.g. checks. The method comprises placing a plurality of documents in a document imaging machine and forming an electronic image of each document, storing each electronic image in an electronic storage device, providing at least one user interface device in communication on a communication link with the electronic storage device, placing a request for at least one document image on the user interface device, transmitting the request by the communication link to the electronic storage device, searching the electronic storage device for the requested electronic image of the document, retrieving the at least one electronic image or providing an indication that the image was not found, storing the electronic image, if found, in an electronic file, for transmission to the user interface device at user option, providing the electronic image to the user interface device at command of a user at the user interface device for storage at the user interface device and displaying the requested electronic image on a display of the user interface device. Preferably, the electronic, images are stored with embedded identifying information in a TIFF® (trademark of Aldus Corp.) file format and the check images can be displayed on a display device which permits the user to view both sides of the checks simultaneously and perform functions such as zooming and rotation of the images.

Thomas Cahill, Louise A. McNulty, John J. McMonagle, Richard H. Sferra, Glenn Levine, Saul Goldfisher, Philip Wilson, and Vladimir Koroteyev, Electronic Check Image Storage and Retrieval System, U.S. Pat. No. 6,181,837 (Jan. 30, 2001) disclose a method and apparatus for storing and retrieving images of documents, e.g. checks. The method comprises placing a plurality of documents in a document imaging machine and forming an electronic image of each document, storing each electronic image in an electronic storage device, providing at least one user interface device in communication on a communication link with the electronic storage device, placing a request for at least one document image on the user interface device, transmitting the request by the communication link to the electronic storage device, searching the electronic storage device for the requested electronic image of the document, retrieving the at least one electronic image or providing an indication that the image was not found, storing the electronic image, if found, in an electronic file, for transmission to the user interface device at user option, providing the electronic image to the user interface device at a user at the user interface device for storage at the user interface device and displaying the requested electronic image on a display of the user interface device. Preferably, the electronic, images are stored with embedded identifying information in a TIFF® (trademark of Aldus Corp.) file format and the check images can be displayed on a display device which permits the user to view both sides of the checks simultaneously and perform functions such as zooming and rotation of the images.

Filip Jay Yeskel, High Volume Document Image Archive System and Method, U.S. Pat. No. 6,115,509 (Sep. 5, 2000) teaches high speed machine scanning of documents such as checks that produces digital check images that are placed in archival storage on mass storage devices for later retrieval. Images and/or documents are automatically reviewed by a machine in order to identify images and/or documents that are of suspect quality. Machine review of suspect images and/or documents provides a reject or accept decision. Only acceptable documents are archived. Accepted documents are formed into large data groups that contain a storage location identification for each individual document within the large data group. An index is stored for each such data group wherein the storage location of each document within the large data group is contained. Digital images are selectively converted to visual images, and these visual images are then reviewed by a human operator. This operator review is used to adjust the machine's accept/reject decision making process, thereby teaching the machine the correct manner of making its accept/reject decision.

It should be appreciated that the disclosures described hereinabove lack certain significant functionality as put forth hereinbelow:

None of the disclosures hereinabove provide a comprehensive index of all paper and electronic transactions allowing for all transactions to be matched to one or more images; provide a system and process capable of accessing multiple internal and external archive systems and operating independently from the archive systems; and provide a system and process capable of satisfying requests for images from microfilm at an item level.

It would therefore be advantageous to provide a comprehensive index of all paper and electronic transactions allowing for all transactions to be matched to one or more images; to provide a system and process capable of accessing multiple internal and external archive systems and operating independently from the archive systems; and to provide a system and process capable of satisfying requests for images from microfilm at an item level.

Furthermore, it would be advantageous to provide means for leveraging previously developed and deployed check image archive investments; to manage a transaction level transition from microfilm storage to digital image storage; to provide a method and apparatus for handling customer transaction conversions while maintaining a path to the image at hand, e.g. conversions from paper payment transactions to electronic (ACH) transactions; to provide a method and apparatus for customers to store information about digital images; to establish a common set of delivery and access services to internal and external users; to provide a method and apparatus for ingesting information about purchased check images; to provide a method and apparatus for linking supporting transaction informational data or digital images to an individual transaction; to provide robust transaction search capability; and to provide a single source for proof of transaction.

SUMMARY OF THE INVENTION

A method and apparatus containing a single master system of record that provides a record of all paper and electronic transactions during a predetermined period of time, that provides capability for directing the retrieval of images stored in multiple and distributed owned and un-owned archives, and that provides a link to all assisting transaction informational data and images, e.g. e-signature, pictures, and handwriting is provided.

BRIEF DESCRIPTION OF THE DRAWINGS

FIG. 8 is a table design according to the invention;

FIG. 9 is a table design according to the invention; and

FIG. 10 is a table design according to the invention.

DETAILED DESCRIPTION OF THE INVENTION

Figure 1:
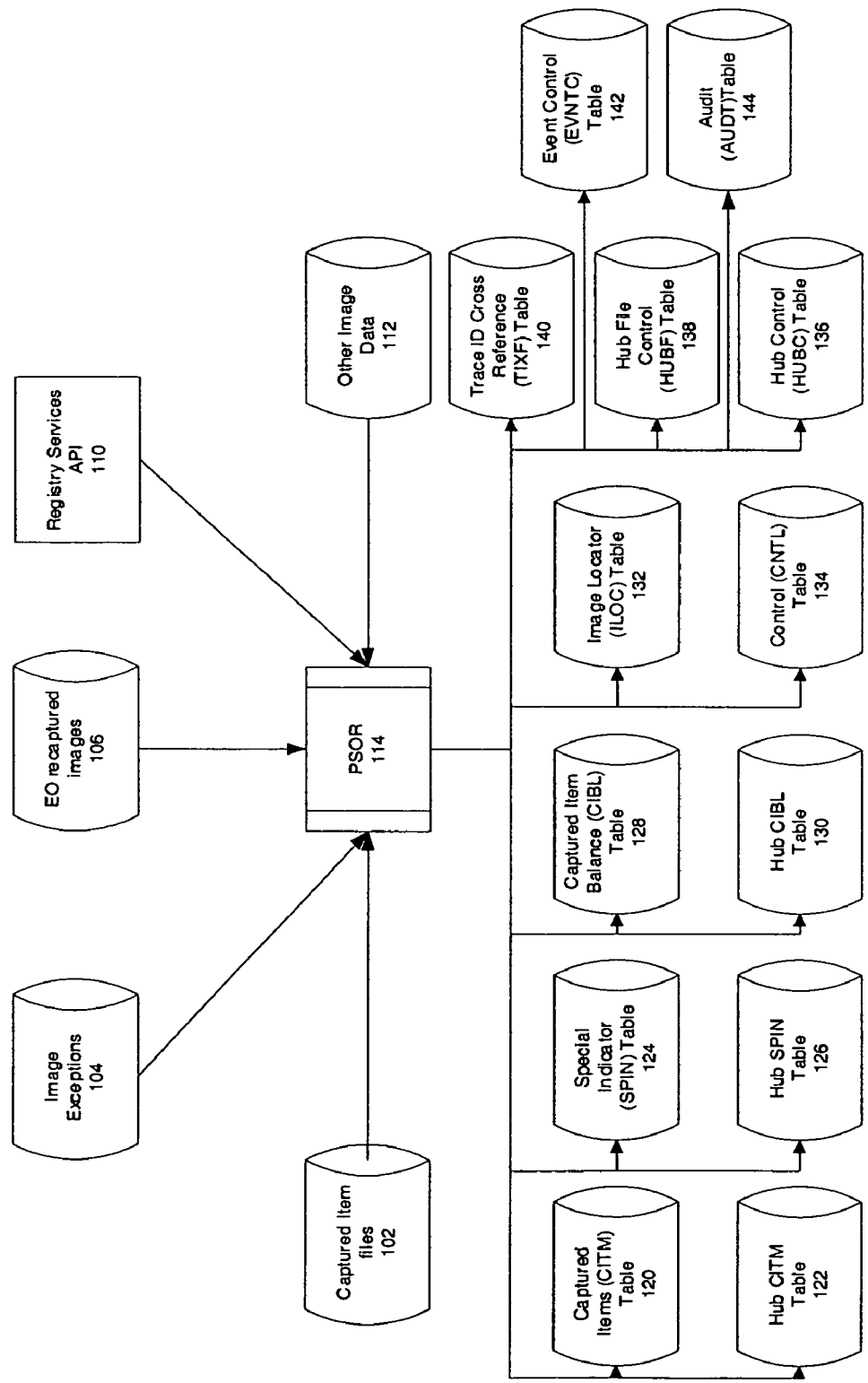
FIG. 1 is a schematic diagram of the main components and their respective relationship according to the invention.

A method and apparatus containing a single master system of record that provides a record of all paper and electronic transactions during a predetermined period of time, that provides capability for directing the retrieval of images stored in multiple and distributed owned and un-owned archives, and that provides a link to all assisting transaction informational data and images, e.g. e-signature, pictures, and handwriting is provided.

Imaging is the ability to capture, store, retrieve, distribute, display, manage, and print business information in digital form. There are two high level groupings within the image family, referred to herein as Transaction Processing Image and File Folder Image. Transaction Processing Image represents the high volume, high speed capture of machine transportable standardized forms such as checks. File Folder Image represents low speed, low volume, typically 8½ by 11 inch documents such as loan documents.

Image archives are the places where captured images of either or both Transaction Processing Image and File Folder Image documents are stored long term. Access to archive data is provided by various indexing schemes, for example: by date and Item Reference Number (IRN), or by account number and amount, etc.

The invention herein provides an indexing infrastructure and use thereof for a combined File Folder and Transaction Processing distributed image archive.

It should be appreciated that the invention is described with reference to a specific application of a transaction or payment system of record. Such area of application is meant by example only. Many other areas of application are possible and are still within the scope and spirit of the invention. Examples of such areas of application are the insurance industry and industries using blueprints.

The invention uses a central indexing methodology to access in-house and out-of-house archives. It provides seamless and ubiquitous access to archived images for an enterprise. The central indexing methodology works in conjunction with an infrastructure for distributed enterprise image archives.

Main Functionality of the Invention

Following is a list of brief descriptions of some of the main functionality of the invention.

- The invention records all in-house transactions, such as monetary transactions, whether there are associated images or not.
- The invention includes informational data, such as payment information, from out-of-house image capture applications where there is a relationship to provide images.
- Records, such as payment records, include a timestamp of when a unit of work was captured.
- Archive maintenance facilities or mechanisms provide updates. For example, files of exceptions, files of additional captured items, and images eliminated from an archive system may each result in a need to update the initial data.
- Means for handling other types of related images, such as the non-monetary fingerprints, eSignature, and pictures images is provided.
- Archive location, archive index, and location of original images and microfilm images are recorded. Specifically, one embodiment of the invention provides means for recording the archive index and means for displaying the archive location and location of original images and microfilm images from an archive registry.
- The invention provides a single access point to multiple archives. This feature allows an enterprise to know if there is an image for an item and provides the access key for that item without having to look at each archive individually.
- The invention provides means for maintaining the number of years of history, such as for example that which is required by law, seven years and three months.
- The invention preferably provides means for handling requests for large numbers of images both online or via a batch process.
- Searchable data elements are accessed by any of:
  - Date, date range/account, account amount, account ABA, account serial, etc.;
  - Date, date range/amount, amount account, etc;
  - Date, date range/IRN;
  - Date, Transaction Unit; and
  - Optional Data Filters.
- The invention returns Expected Time of Retrieval (ETR) to each requester. An image request is a separate call to the actual image archive services.
- The invention is available 24 hours a day, 7 days a week with normal data center downtime.
- The provided system of record is accessible by both internal and external customers after passing appropriate security services such as RACF, Top Secret, and ACF2.
- The invention provides means for controlling incoming search requests, for example the invention allows editing incoming search requests.
- Images are viewable by using a preexisting enterprise standard browser.
- An audit trail is provided.
- An example response time performance by query service for a 100 concurrent user environment according to the invention is depicted in Table A hereinbelow:

TABLE A

| Type of Search | Response Time Will be less than the following for 95% of Queries for up to 100 items being returned. |
|---|---|
| Account Number, for a given date | 2 seconds |
| Account Number, for a given date range up to one week | 3 seconds |
| Account Number, for a given date range up to 30 days | 5 seconds |
| Account Number, for a given date range up to 60 days | 6 seconds |
| IRN, for a given date (Single date search only). | 3 seconds |
| IRN and Amount range, for a given date (Single date search only). (Provided it is a relatively unique amount) | 5 seconds |
| Account & Amount, for a given date | 2 seconds |
| Account & Amount, for a given date range up to one week | 3 seconds |
| Account & Amount, for a given date range up to 30 days | 5 seconds |
| Account & Amount, for a given date range up to 60 days | 6 seconds |
| Account & Serial Number, for a given date | 5 seconds |
| Account & Serial Number, for a given date range up to one week | 7 seconds |
| Account & Serial Number, for a given date range up to 30 days | 10 seconds |
| Account & Serial Number, for a given date range up to 60 days | 12 seconds |
| Amount Only, for a given date, provided it is a relatively unique amount. | 5 seconds |
| Amount Only, for a given date range up to one week, provided it is a relatively unique amount. | 7 seconds |
| Amount Only, for a given date range up to 30 days, provided it is a relatively unique amount | 10 seconds |
| Amount Only, for a given date range up to 60 days, provided it is a relatively unique amount | 12 seconds |
| Account & Amount range, for a given date (returns on-us items only) | 20 seconds |
| Account & Amount range, for a given date range up to one week (returns on-us items only) | 30 seconds |
| Account & Amount range, for a given date range up to 30 days (returns on-us items only) | 45 seconds |
| Account & Amount range, for a given date range up to 60 days (returns on-us items only) | 60 seconds |
| Account & Serial Number range, for a given date | 12 seconds |

TABLE A-continued

| Type of Search | Response Time Will be less than the following for 95% of Queries for up to 100 items being returned. |
|---|---|
| Account & Serial Number range, for a given date range up to one week | 20 seconds |
| Account & Serial Number range, for a given date range up to 30 days | 30 seconds |
| Account & Serial Number range, for a given date range up to 60 days | 45 seconds |
| Amount range, for a given date. (Provided it is a relatively unique amount) | 20 seconds |
| Amount range, for a given date range up to one week. | 30 seconds |
| Amount range, for a given date range up to 30 days | 45 seconds |
| Amount range, for a given date range up to 60 days | 60 seconds |
| Account, Amount & Serial Number range, for a given date | 20 seconds |
| Account, Amount & Serial Number range, for a given date range up to one week | 30 seconds |
| Account, Amount & Serial Number range, for a given date range up to 30 days | 45 seconds |
| Account, Amount & Serial Number range, for a given date range up to 60 days | 60 seconds |

It should be appreciated that the response times stated hereinabove include those areas that are within the control of the provided master system of record.

An Exemplary Payment System of Record

Following is an exemplary implementation of the invention. It should be appreciated that the specific implementation of databases used and table and data structure are meant by example only and that other implementations are possible and are within the scope and spirit of the invention. For example, the invention can be used for financial institutions, in the insurance industry, in the healthcare industry, and in retail.
Overview.

The invention can be described with reference to FIG. 1, where FIG. 1 is a schematic overview diagram of the main input and table components of a payment system of record and their respective relationship according to the invention. Input comprising, but not limited to one or more check capture (ECOM) files 102, Image Exception files 104, EO recaptured files 106 which are done for the purpose of capturing the image, Registry Services APIs 110, and files of Other Image Data 112 provide data to a system of record processor 114. The processor 114 processes input data and provides resulting data (output data) to various logical entities comprising, but not limited to CITM Table 120, Hub CITM Table 122, SPIN Table 124, Hub SPIN Table 126, CIBL Table 128, Hub CIBL Table 130, Image Locator Table 132, Control Table 134, Hub Control Table 136, Hub File Control Table 138, Trace ID Cross Reference Table 140, Event Control Table 142 and Audit Table 144. Definitions and detailed descriptions of each of the components and their respective functionality are provided hereinbelow.

Figure 2:
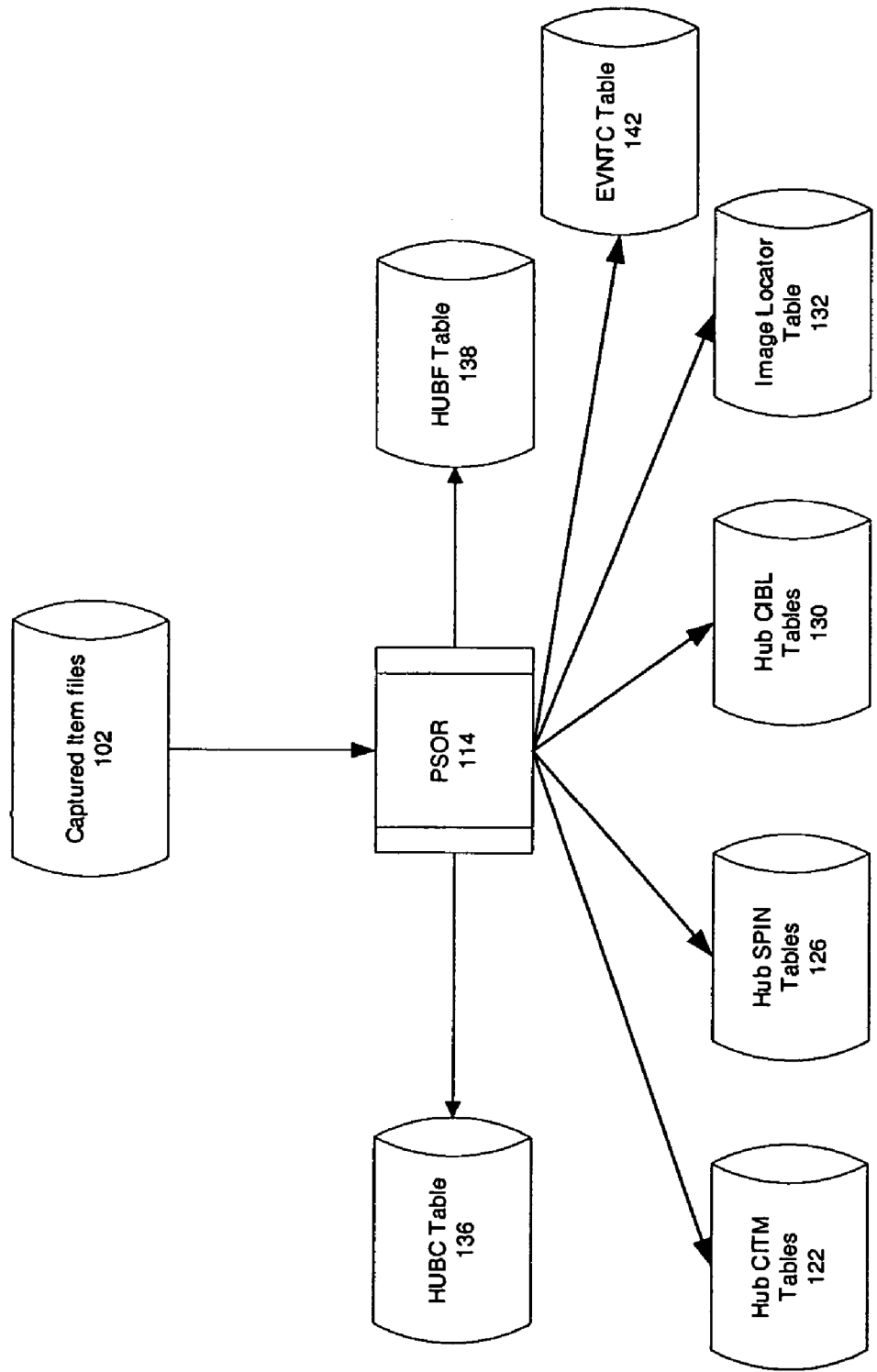
FIG. 2 is a schematic diagram of intra-day processing according to the invention.

FIG. 2 is a schematic diagram of intra-day processing according to the invention. The intra-day check capture file 102 processing is preferably similar to the above check capture captured item flow The intra-day file 102 is processed to provide information for Hub CITM Table(s) 122, Hub SPIN Table(s) 126, Hub CIBL Table(s) 130 as in FIG. 1, but in addition, new day data for image key and image type is provided in the input data. Also, each item having a microfilm is flagged as such. The invention uses an indicator field to identify items having a digital image, items having microfilm, and items having both. The processor 114 also provides data for loading into the Image Locator Table 132. A Hub Control Table 136 contains a unit number range for the particular check capture HUB being processed. A Hub is a specific source of monetary data, for example, a check processing site. The Hub File Control Table 138 and Event Control Table 142 provide processing control information and also the ability to perform incremental processing as needed.

Figure 3:
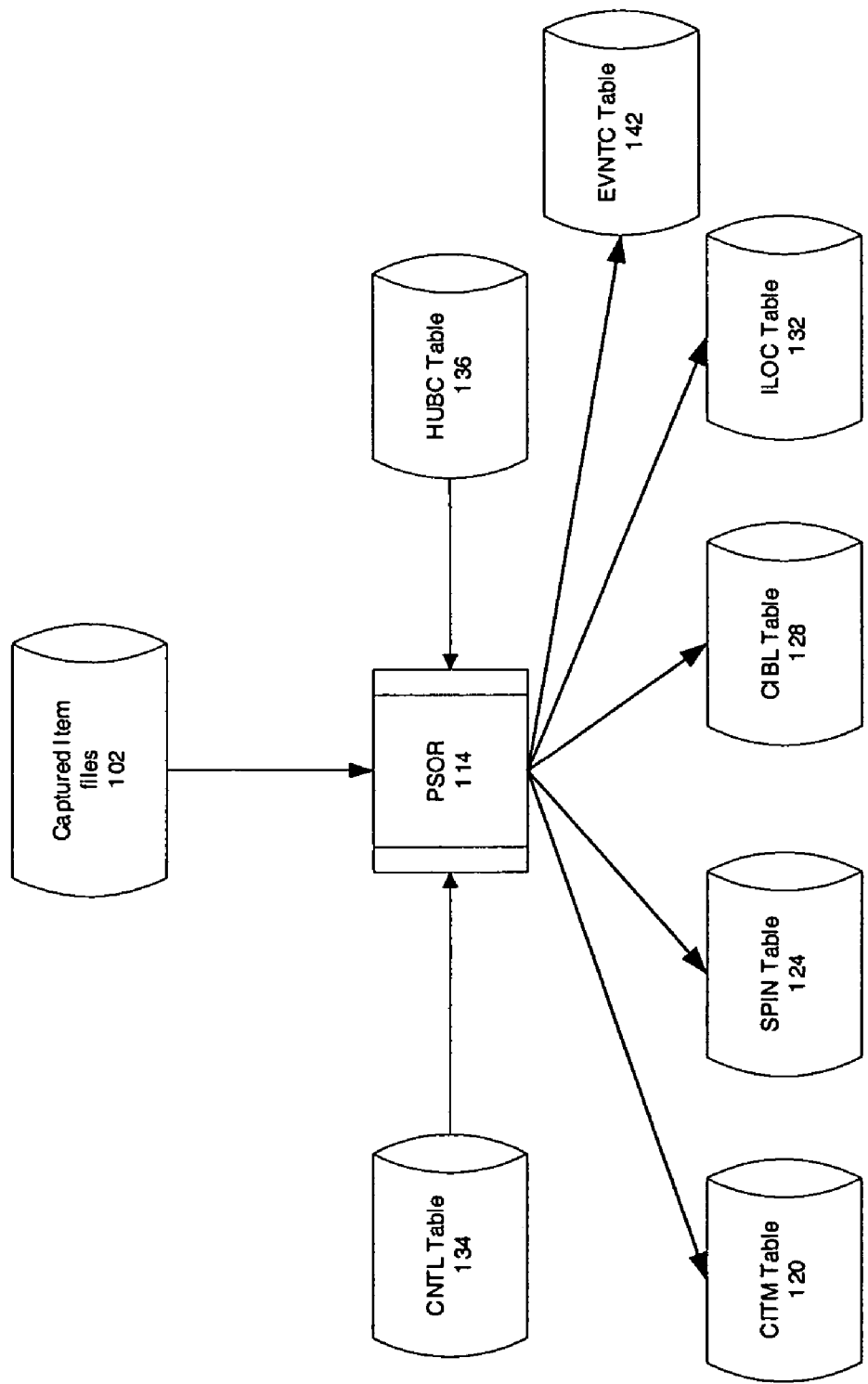
FIG. 3 is a schematic diagram of final processing according to the invention.

FIG. 3 is a schematic diagram of End of Day processing according to the invention. The final check capture file 102 processing is preferably similar to the above check capture captured item flow. The check capture file 102 is processed to provide information for CITM Table(s) 120, SPIN Table(s) 124, CIBL Table(s) 128 as in FIG. 1, but in addition, provides additional data for the current day, including image key and image type. Also, each item having a microfilm is flagged as such. The invention uses an image indicator field to identify items having a digital image, items having microfilm, and items having both. The processor 114 also provides data for loading into the Image Locator Table 132. A Hub Control Table 136 contains a unit number range that the processor 114 assigns to the current processing group. The Control Table 134 and Event Control Table 142 provide processing control information and also the ability to perform incremental processing as needed.

Figure 4:
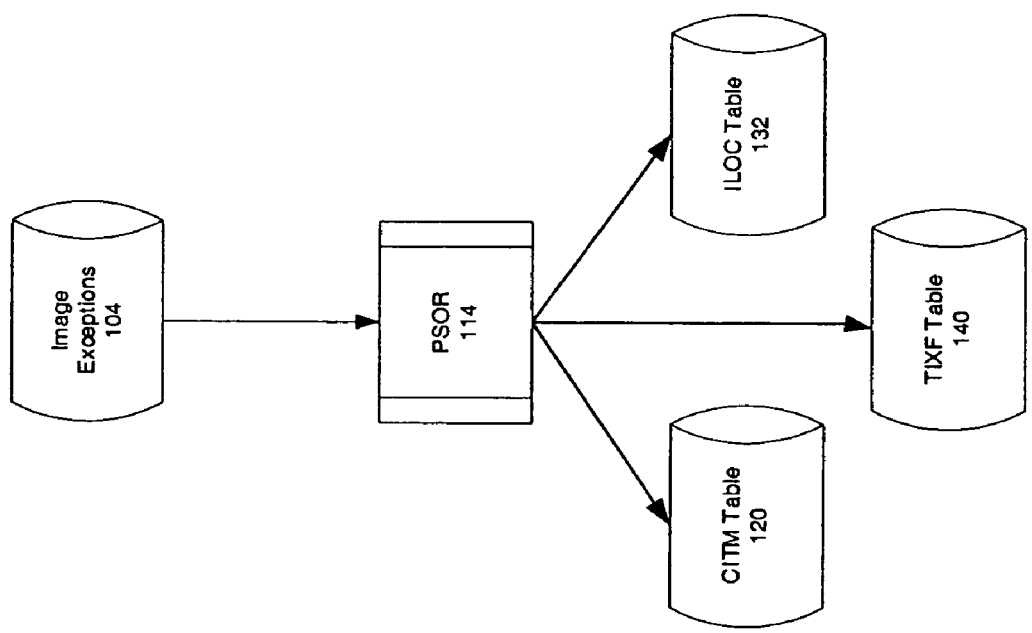
FIG. 4 is a schematic diagram of image exception processing according to the invention.

FIG. 4 is a schematic diagram of image exception processing according to the invention. An exception file is a new file received from a document repair system after the document repair process. The exception file contains MICR data, a TRACE_ID and the date for items that were flagged as having an image, but after going through the archive document repair process, it was determined that a valid image was not available. The invention processes this file by updating the CITM Table 120, the ILOC Table 132 and the TIXF Table 140 (if cross referenced) for the associated record. The invention ensures that an indicator flag, IMAGE_IND is set to indicate there is no image because the item is missing or unreadable. Such process is designed to run with only header and trailer information, i.e. no detail, in cases where there is no exception data to ensure application to application control.

Figure 5:
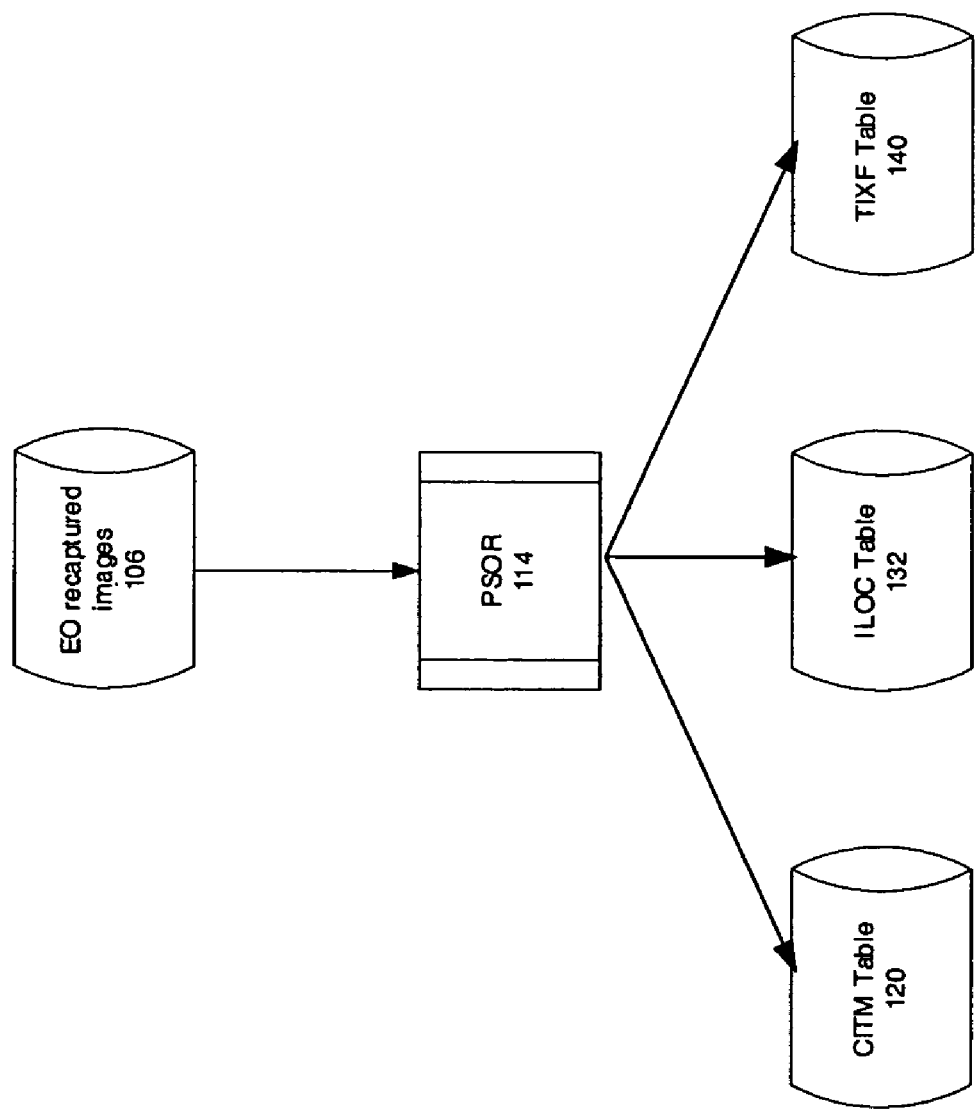
FIG. 5 is a schematic diagram of recaptured image processing according to the invention.

FIG. 5 is a schematic diagram of recaptured image processing according to the invention. Recaptured MICR lines with image key information 106 are sent to the processor 114 as a separate input file. Such file contains MICR line and image information for items that have gone through an image lift recapture process. The original items are already loaded into the CITM Table 120 as part of the check capture file 102, i.e. intra-day or final input. A file of recaptured items is sent to the processor 114 containing the image key, image type, and all fields necessary to build a new CITM record. Such images and information sent include a new source and a new IRN. Data sent to the processor 114 from recapture includes the original MICR line, the original IRN and the original date so that the processor 114 can link such items from the original check capture file 102 and the recapture file 106. The processor 114 loads new record and new image information into the CITM Table 120 and the Image Locator Table 132 respectively. Using information sent for the original item, the processor 114 attempts to retrieve the original prime pass and/or repair item from the CITM Table 120. If the item is retrieved and the image indicator flag IMAGE_IND is on, cross-reference entries are then built into the Trace ID Cross Reference Table 140 for ensuring the user is able to retrieve both images. If the item is retrieved and the image indicator flag IMAGE_IND is not on, then the processor 114 sets the IMAGE_IND to on for the original prime pass and/or repair item and adds the entries in the Trace ID Cross Reference Table 140 for the prime pass and/or the repair item to the new record.

Figure 6:
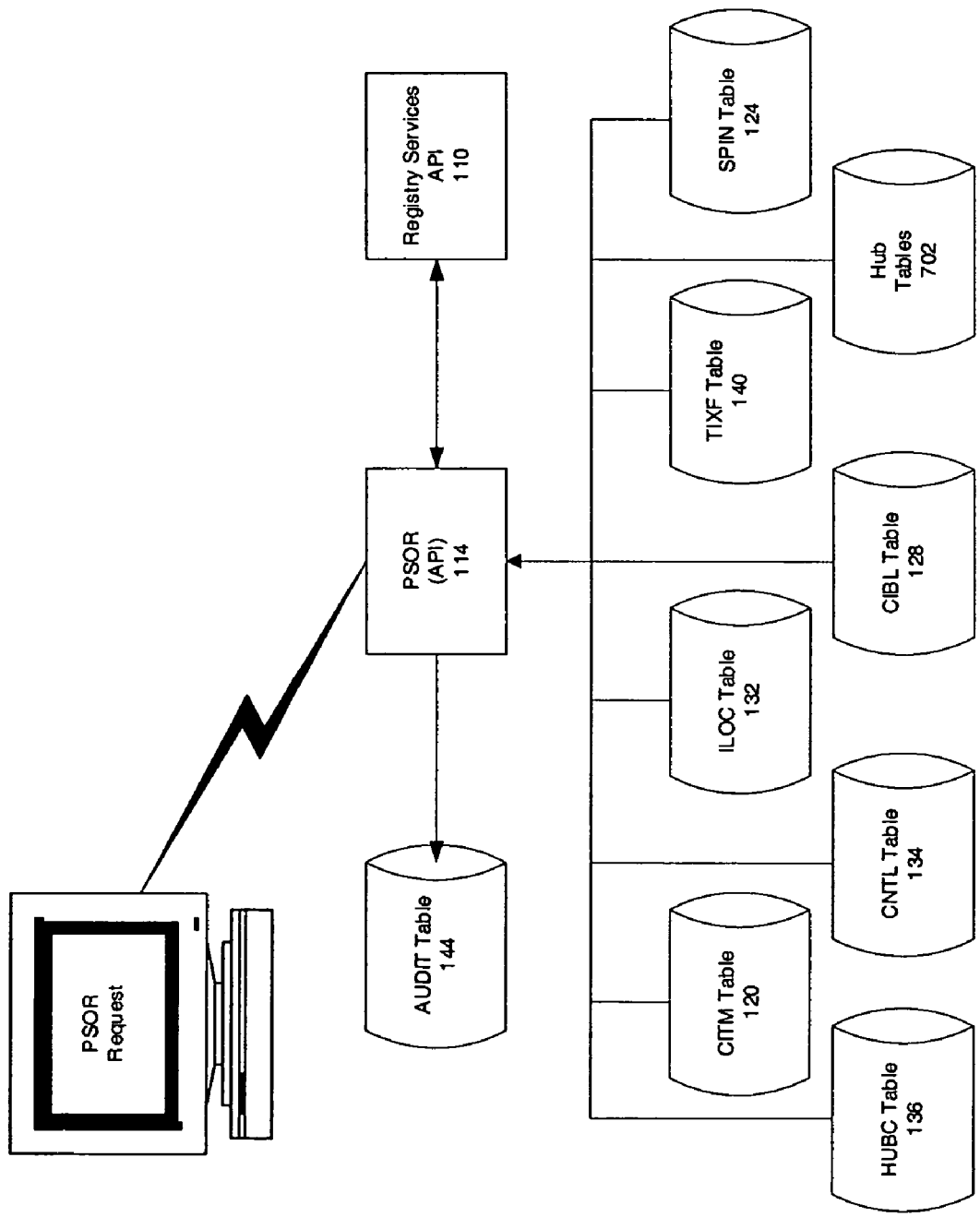
FIG. 6 is a schematic diagram of request/response processing according to the invention.
Figure 7:
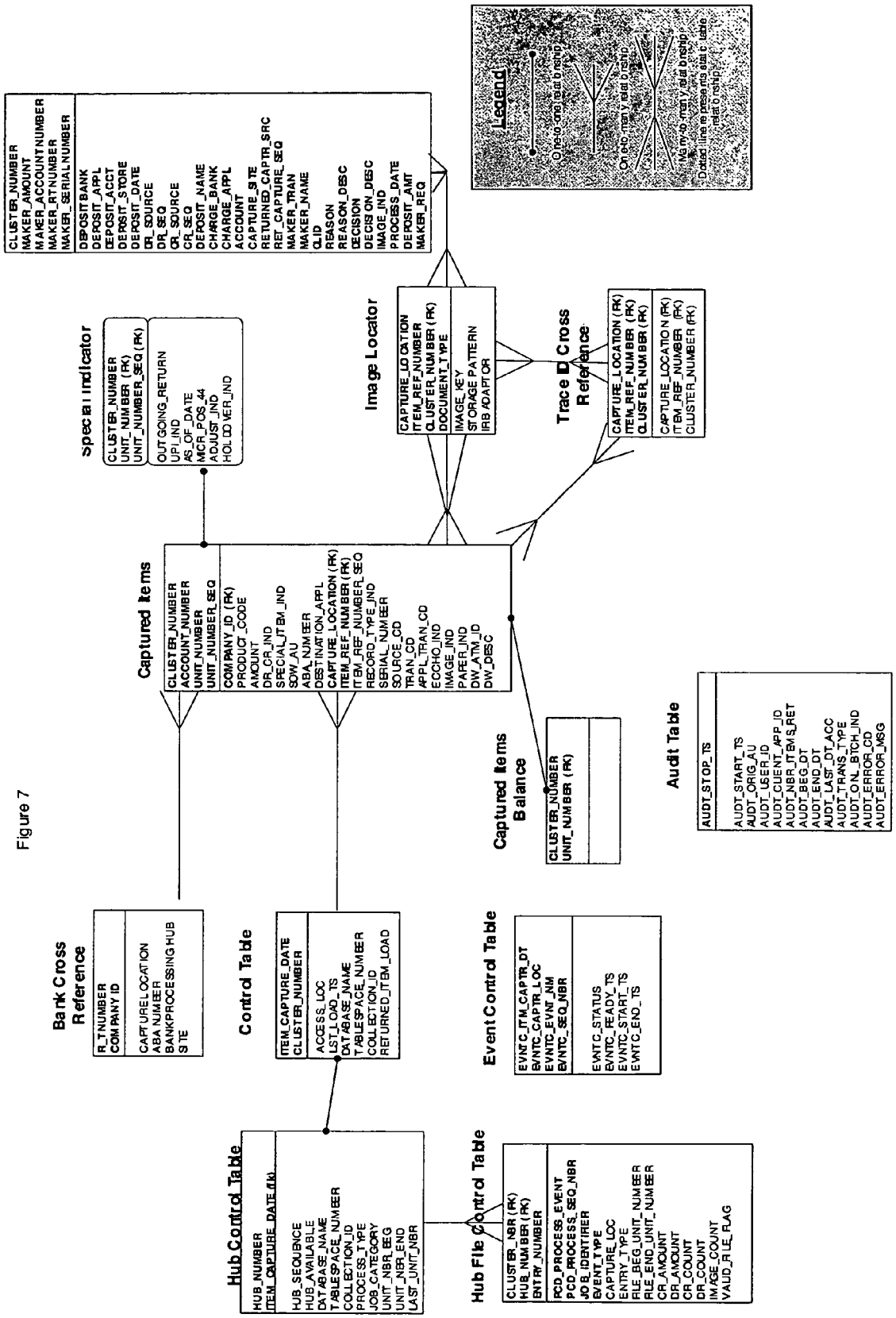
FIG. 7 is a logical database design according to the invention.

FIG. 6 is a schematic diagram of request/response processing according to the invention. A request coming into the processor 114 through API of the invention is typically a request for a list of items. The processor 114 retrieves the list of items from the CITM table 120 and any associated SPIN Table 124 and CIBL Table 128 information. The CNTL Table 134 is used for determining where data resides. If it is determined that data has not yet been loaded to a final daily table, then the Hub Control Table 136 and various Hub Tables 702 are used for retrieving the data. Individual HUB tables are used to make data available to customers at the time the HUB completes capture of monetary items for that period, as opposed to waiting for all HUBs to complete to make data available. If the image field is set, the processor 114 retrieves the associated image key and image type from the Image Locator Table 132 and, using the associated trace id, retrieves any associated items from the Trace ID Cross Reference Table 112. Using items retrieved from the Trace ID Cross Reference Table 112, the processor 114 retrieves the image types of the associated items. After such data is retrieved, then a best image is determined. The processor 114 then uses the Registry Services API 110 for retrieving data needed for completing the request, such as, for example, Estimated Retrieval Time (ETR). A response is sent to the requester.

DB2

In one embodiment of the invention, DB2 is the database methodology for the following reasons:

Most of the data is created on the mainframe; therefore building the tables on the mainframe saves transmittal time and bandwidth.

Mainframe DB2 is a solid, proven, stable product.

Mainframe DB2 may have licensing already in place.

Mainframe DB2 may be a sunk cost.

It has been found that mainframe DB2 provides exemplary retrieval processing performance.

Example Embodiment

The invention can use separate sets of tables for intra-day, daily, and weekly processing, respectively. Below is a discussion and description of example table functionality provided by the invention. It should be appreciated that such table layout and functionality is by example only and that other implementations are possible according to the invention.

Tables (Refer to FIGS. 7-10)

Image Locator Table (ILOC)—This table holds the Image Key, Image Request Block (IRB) Adapter, and Image Type that are passed to the processor 114 and are used to retrieve the archive information. This table contains one record per image. This table has a primary key comprised of cluster number, item reference number, capture location (source id) and document type.

Hub File Control Table (HUBF)—This table is used to allow the individual capture sites to process multiple input files on a daily basis, but not necessarily always the same number of files, and contains control point information regarding the previous day's totals. This table also contains control point information for the individual entries sent in each captured data file. This table contains one record per entry processed. The primary key on this table is comprised of the cluster number and the beginning and ending unit numbers.

Hub Control Table (HUBC)—This table is used to determine which of the hub (intra-day) tables contain data that needs to be retrieved. The table contains information pertinent to the processing of the hub. The primary key is comprised of item capture date, hub number, hub sequence number and hub available flag.

Trace ID Cross Reference Table (TIXF)—Provides the ability to connect multiple images to a given item as well as cross connect recaptured item images. The primary key is comprised of the cluster number, capture location (source id) and item reference number.

Captured Item Table (CITM)—This is the primary table, housing all item data and used as the source for retrieval of data from other tables. In one embodiment of the invention, there is one Captured Item Table/day. The primary key is comprised of cluster number, account number, unit number, unit number sequence, and the serial number.

Special Indicator Table (SPIN)—This table houses the unposted item reason, as-of-dates and other special information for the items. In one embodiment of the invention, there is one Special Indicator Table/day. The primary key is comprised of the cluster number, unit number and unit number sequence.

Captured Item Balance Table (CIBL)—This table houses the transactions that are out of balance. This information provides a flag to customers that the transaction is on balance (credit dollars=debit dollars). In one embodiment of the invention, there is one Captured Item Balance Table per day. The primary key is comprised of the cluster number and the unit number.

Returned Item History Table (RITM)—This table is a specialized table of incoming returned item data that is fed to the processor 114 on a daily basis. This data is used to retrieve the image for a returned item.

Control Table (CNTL)—This table controls dates and indicates when a table has been loaded. The Control Table is an internal table used for processing the various hubs and indicating when data is available. The table also includes the database name, the tablespace number, and the collection id for the information.

Event Control Table (EVNTC)—This table is used to ensure that processing is completed for one intra-day cycle prior to the next intra-day cycle being initiated. The primary key is comprised of the capture date, capture location, event name, and event sequence number.

Audit Table (AUDT)—This table contains a record for each request made to the invention from a client system. The primary key is the stop timestamp.

Security

The invention allows for all operations and files to be secured against unauthorized execution, modification, or access, such as by ACF2, TOP SECRET, and RACF.

Additionally, the invention allows the portal to have the responsibility of authenticating and controlling data access, which can be beneficial for external customers.

System Flow

Following is a description of an exemplary system flow for the example of adding captured items technology to the pre-existing archive system. It should be appreciated that the description of system flow in the context of this example is by example only and that other implementations of system flow are possible and are within scope and spirit of the invention.

Input Processing

One or more feeder applications deliver the Interface File for each individual entry. This allows the invention the capability to process by Hub, i.e. a check processing site, one at a time, several at a time, or all of them at a time.

When the invention extracts and processes one or several of packets (files or entries) each such packet or entry is recorded in the Hub File Control Table when it is processed. The invention also determines if an entry is re-extracted. The Cluster Number, Hub Number, Source Id, Entry Number, and File Sequence Number are the keys to this table. The Cycle Date, Source Id, Entry Number, and File Sequence Number are passed to the processor 114 in each packet. The processor 114 maps which Source Id belongs with which Hub.

Also, the processor 114 can send notification back to the feeder application to convey that the invention has successfully processed such entries.

After the processor 114 has processed n packets and puts the data into the load format, the invention determines if any duplicate entries need to be deleted. If there are duplicate entries, the invention eliminates such entries by reading the previous processed file, which is an accumulation of all entries that were loaded the previous time, and deleting those records in the Unit Number range, originally assigned when the prior version of that entry was processed.

After any duplicate entries are eliminated, the invention resolves duplicate IRNs and sorts the data into Account Number order. Thus, data is ready to be loaded into a Hub Table.

The above processes handle the data that is to be loaded into the Captured Item Table. The same process for eliminating records from duplicate entries is used on the Special Indicator Table. The Image Locator Table and the Trace ID Cross Reference Table can have an intermediate file, i.e. non-loadable file, that contains the loadable data plus the additional Unit Number Field. The same process for eliminating records from duplicate entries is used on the intermediate files for the Image Locator Data and the Trace ID Cross Reference Data.

There are typically multiple sets of Detail Tables for each Hub that is processed in this fashion. An example set of Detail Tables is the following:

Captured Item Table (CITM);
Special Indicator Table (SPIN);
Image Locator Table (ILOC); and
Trace ID Cross Reference Table (TIXF).

It should be appreciated that in this embodiment of the invention, each set of detail tables is called an Intra-day table. When a set of Intra-day Tables are loaded, the Hub Control Table is updated to reflect which set of Intra-day Tables contains the most current accumulative data. This parameter in the Hub Control Table is read so the API programs access the correct set of intra-day tables.

When the feeder application, typically check processing for example, has finished processing all entries for a Hub for the cycle, the feeding application signals the processor 114 that it is finished sending entries for a Hub for the cycle. The feeding application also sends a Handshake file by Hub which is used by the processor 114 to perform a final cross-check that each entry has been received and processed.

In addition to the processing thus far, the capability to delete an entry from a hub in a cycle is handled automatically without programmer intervention. This step automates the removal of erroneous data, for example, an entry that is run on the wrong cycle that isn't caught until after the extract. When this happens, the feeding application sends this information to the processor 114, just as with a good entry. The difference is an indicator in the header indicating this entry has been deleted. When the processor 114 processes this packet, it updates a valid file flag and deletes the entry from the current processed file or the previous accumulated processed file.

Referring to FIG. 4, image exceptions processing according to the invention is described in further detail. It can be shown that the invention provides an exception file that is a file received from an archive processing system after it has completed a document repair process. These files will contain the MICR data, the TRACE_ID and the date for the items that were flagged as having an image, but after going through the archive document repair process, it was determined that a valid image was not available. The invention processes these files by reading the TRACEID XREF table to determine if a cross-reference is available. If there is no cross-reference, the processor 114 updates the CITM table for the associated record to ensure that the IMAGE_IND is set to indicate an image is not available and deletes the IMAGE LOCATOR record. If there is a cross-reference entry, the processor 114 deletes the corresponding IMAGE LOCATOR record but does not change the IMAGE_IND. This process is designed to run with only header and trailer information (no detail), in cases where there is no exception data.

The invention further provides a similar job process wherein the image indicator is turned on and ancillary image fields are added using this same file format. This job is used for an on-request run.

Refer to FIG. 5 to understand recaptured image processing according to the invention in further detail. A recapture file is sent to the processor 114 containing the image key, storage pattern, IRB, date of the recapture, information for finding the original CI record, as well as a new source id and new IRN. The information used for finding the original CI record is the capture location (source id), IRN, and capture date, or the account, amount and serial number. Using information sent for the original item, the invention retrieves the original prime pass and/or repair item from the CITM table. If the item is retrieved, the processor 114 builds an ILOC table record. If the image indicator flag is on, for the retrieved record, cross reference entries are then built into the TIXF (Trace ID Cross Reference) table for ensuring the user is able to retrieve both images. If the item is retrieved and the image indicator flag is not on, then the invention sets the image indicator flag to on for the original prime pass and/or repair item and adds the entries to the TIXF table for the prime pass and/or repair item to the new record.

Output Processing

Message Units

In the invention, Message Units (MU) are used as a means of providing APIs into the processor 114. The message unit technology is based on a fixed length data string for the request and a fixed or variable length data string for the response. There is a standard header associated with the request and response and a returning data area that is predefined.

This MU technology is the underlying method of accessing the current processor 114 discussed herein.

The invention also implements the following additional communications interfaces:

:http and TCP/IP

The Middleware Services (MWS) infrastructure currently has the capability to support :http and/or TCP/IP as a transport protocol from the client to the mainframe. All message units of the invention are available with a :http transport interface.

MQ

As a transport mechanism, MQSeries provides a cross-platform standard. The invention has the capability to accept Message Units that are transported via MQSeries, and to respond in kind. All message units of the invention are available with an MQSeries transport interface.

HTML/XML

XML is a growing standard throughout the industry. Although a good mainframe XML parser has not yet been identified, the invention could work with any front-end client that would like to use XML for communicating.

Interface Controls

Following are interface controls and their use, according to the invention.

Channel to Channel

The invention legislates file headers and trailers on all input files to meet this control requirement. Input files determined to be out-of-balance result in an abend which can be overridden from the JCL.

Handshake Controls

The invention stores file count and/or amount information in the Hub File Control Table. Each new input file is validated against the prior day's count/amount to ensure against a duplicate input file. Suspect duplicates cause an abend which can be overridden from the JCL.

Application Balancing

The invention issues a warning if the count of the data loaded for a hub differs from the input count from the hub file control. The warning triggers a page to the application on-call person and e-mail to the project and district managers. For the loading of the daily tables, if the load counts do not match the accumulated hub counts, an abend occurs. The abend can be overridden from the JCL.

End-Of-Life

In one embodiment of the invention, the proposed end-of-life for the data is seven years and three months. The design is that at the end of seven years and 3 months, the oldest table containing data is overwritten with new data. This takes place on a weekly basis.

The invention, at the end of seven years and three months, unloads the table that would be overwritten, extracts the data that needs to be saved (the data that has a longer retention period) and loads that subset of data into a new table. This adds processing complexity to the process, but greatly reduces DASD usage.

Data Loading

The invention loads data using the highest performance process available that meets the Service Level Agreement (SLA) and delivery requirements.

For most hubs, such data loading continues to be a load to the early availability (hub) tables followed by a final daily table load when the final data is available from all input sources.

Exemplary Interfaces

Following are exemplary interface methodologies used by one embodiment of the invention. It should be appreciated that the descriptions of the interface functionality are meant by example only and by no means limit the invention by its application to this example. It should further be appreciated that the functionality provided by the invention is readily apparent and the example is for illustrative purposes only.

Following are three primary methods of retrieving data.

The first method is through the use of a capture file, referred to herein as the CAPTURE2 file, which is an all-items QSAM file, produced on a daily basis. The CAPTURE2 file can be transmitted from/to other sites.

The second method of retrieving data from the processor 114 is through the use of the batch API interface, referred to herein also as batch Message Units (MU). The same request and response block are used for the batch process as are used for the on-line MUs. The client batch program does a link to the API and the batch API processes the request.

The third method of accessing RE data is through the use of the on-line APIs, the MUs/MQ, etc. These are accessed either through native CICS using CICS applications, through MQ, or from client front-end systems utilizing either TCP/IP or :https as a transport protocol.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for providing an online single master system of record, said method comprising:
    storing a set of images in a set of image archives, the set of image archives including at least a first image archive and a second image archive, the set of images including a first image and a second image, the first image archive storing the first image digitally, the second image archive storing the second image on microfilm, the first image archive and the second image archive being geographically distributed;
    storing, at a digital repository, a master system of record for a financial institution, the master system of record containing records, the records recording financial transactions in a set of financial transactions, each of the financial transactions occurring during a predetermined period of time, the financial transactions including a first transaction, a second transaction, and a third transaction, the records including a first record, a second record, and a third record, the first record recording the first transaction, the second record recording the second transaction, the third record recording the third transaction,
    wherein each of the first record, the second record, and the third record has an image indicator field, the image indicator field of the first record indicating that an image in the set of images is associated with the first transaction, the image indicator field of the second record indicating that an image in the set of images is associated with the second transaction, the image indicator field of the third record indicating that no image is associated with the third transaction,
    wherein the first record is available in the master system of record at a time a hub captures monetary items for a period during a current day, the hub being a check processing site, the monetary items including a check associated with the first transaction;
    receiving, at a computing apparatus associated with the financial institution, a search request from a client device before an end of the current day, the client device associated with a customer of the financial institution, the client device and the computing apparatus communicating using HTTP and TCP/IP as a transport protocol for the search request, the search request specifying a first set of information, the first set of information identifying the first transaction and the second transaction;
    in response to receiving the search request, using, by the computing apparatus, the first set of information to identify the first record and the second record;
    after identifying the first record and the second record, determining, by the computing apparatus, that the image indicator field of the first record indicates that an image in the set of images is associated with the first transaction and that the image indicator field of the second record indicates that an image in the set of images is associated with the second transaction;
    sending a response from the computing apparatus to the client device, the computing apparatus sending the response before the end of the current day, the computing apparatus sending the response to the client device in response to receiving the request from the client device, the response containing information that identifies a location of the first image archive and a location of the first image within the first image archive, the response containing information that identifies a location of the second image archive and a location of the second image within the second image archive, the first image associated with the first transaction, the second image associated with the second transaction, the client device and the computing apparatus communicating using HTTP and TCP/IP as a transport protocol for the response, the client device being remote from the image archives.

2. The method of claim 1,
wherein the first image archive is not owned by an owner of the master system of record and the second image archive is owned by the owner of the master system of record.

3. The method of claim 1,
wherein the first transaction is a payment transaction; and
wherein the first image is a payment image.

4. The method of claim 1,
wherein the set of financial transactions includes financial transactions that occurred on the current day and financial transactions that occurred prior to the current day; and
wherein the storing the master system of record comprises:
   maintaining, at the digital repository, a captured item table that includes records of the financial transactions that occurred prior to the current day; and
   maintaining, at the digital repository, a hub captured item table that stores records of the financial transactions that occurred on the current day at the hub; and
wherein the method further comprises:
   determining, by the computing apparatus, in response to receiving the search request, whether the captured item table includes the first record;
   retrieving, at the computing apparatus, the first record from the hub captured item table after determining that the captured item table does not include the first record.

5. The method of claim 1,
wherein the records include a fourth record and the financial transactions include a fourth transaction, the fourth record recording the fourth transaction, the fourth record indicating that an image in the set of images is associated with the fourth transaction;
wherein the set of images does not include an image associated with the fourth transaction; and
wherein the method further comprises:
   receiving, at the computing apparatus, an image exception file that specifies the fourth record; and
   updating, by the computing apparatus, in response to receiving the image exception file, the fourth record to indicate that no image is associated with the fourth transaction.

6. The method of claim 1,
wherein the records include a fifth record and the financial transactions include a fifth transaction, the fifth record recording the fifth transaction, the fifth record indicating that an image in the set of images is associated with the fifth transaction;
wherein the method further comprises receiving, at the computing apparatus, a recaptured input file that includes recaptured magnetic ink character recognition (MICR) information associated with the fifth transaction, the recaptured input file also including a recaptured image associated with the fifth transaction; and
wherein the method further comprises updating, by the computing apparatus, in response to receiving the recaptured input file, the fifth record such that the fifth record indicates that the recaptured MICR information is associated with the fifth transaction and that the recaptured image is associated with the fifth transaction.

7. The method of claim 1, wherein storing the master system of record comprises automatically removing, at the computing apparatus, the first record when the predetermined amount of time has passed since the first transaction occurred.

8. The method of claim 1, wherein storing the master system of record comprises receiving, at the computing apparatus, the first image from an out-of-house digital image capture application.

9. The method of claim 1, further comprising:
   automatically calculating, by the computing apparatus, in response to receiving the search request, an estimated amount of time to retrieve the first image from the first image archive; and
   sending the estimated amount of time from the computing apparatus to the client device.

10. The method of claim 1, wherein the client device is outside the financial institution.

11. The method of claim 1,
wherein the method further comprises storing, at the digital repository, for the predetermined amount of time, a set of image locator records, each image locator record in the set of image locator records indicating a location of an image in the set of images;
wherein sending the response comprises utilizing, by the computing apparatus, information in the first record to identify a first image locator record in the set of image locator records; and
wherein the method further comprises sending the first image from the location indicated by the first image locator record to the client device.

12. The method of claim 1,
wherein the method further comprises:
   storing a set of transaction balance records at the digital repository, each of which indicates a financial transaction in the set of financial transactions that is out-of-balance;
   utilizing, by the computing apparatus, in response to receiving the search request, information in the first record to determine whether the set of transaction balance records includes a first transaction balance record, the first transaction balance record indicating that the first transaction is out-of-balance; and
   sending, after determining that the set of transaction balance records includes the first transaction balance record, a message from the computing apparatus to a sender of the search request, the message notifying the sender that the first transaction is out-of-balance.

13. The method of claim 1,
wherein the method further comprises:
   storing, at the digital repository, a set of special indication records, each of which indicates a financial transaction in the set of financial transactions that is unposted;
   utilizing, by the computing apparatus, in response to receiving the search request, information in the first record to determine whether the set of special indication records includes a first special indication record, the first special indication record indicating that the first transaction is unposted; and sending, after determining that the set of special indication records includes the first special indication record, a message from the computing apparatus to the client device, the message notifying the client device that the first transaction is unposted.

14. A system for providing an online single master system of record, the system comprising:
   a set of image archives that stores a set of images, the set of image archives including at least a first image archive and a second image archive, the set of images including at least a first image and a second image, the first image archive storing the first image digitally, the second image archive storing the second image on microfilm, the first image archive and the second image archive being geographically distributed;
   a digital repository that stores a master system of record for a financial institution, the master system of record storing records, the records recording financial transactions in a set of financial transactions, the master system of record storing the records for a predetermined amount of time, the financial transactions including at least a first transaction, a second transaction, and a third transaction, the records including a first record, a second record, and a third record, the first record recording the first transaction, the second record recording the second transaction, the third record recording the third transaction,
   wherein each of the first record, the second record, and the third record has an image indicator field, the image indicator field of the first record indicating that an image in the set of images is associated with the first transaction, the image indicator field of the second record indicating that an image in the set of images is associated with the second transaction, the image indicator field of the third record indicating that no image is associated with the third transaction,
   wherein the first record is available in the master system of record at a time a hub captures monetary items for a period during a current day, the hub being a check processing site, the monetary items including a check associated with the first transaction; and
   a processor that is configured to:
      receive a search request from a client device before an end of the current day, the search request specifying a first set of information, the client device associated with a customer of the financial institution, the client device and the computing apparatus communicating using HTTP and TCP/IP as a transport protocol for the search request, the first set of information identifying the first transaction and the second transaction;
      in response to receiving the search request, use the first set of information to identify the first record and the second record;
      after identifying the first record and the second record, determine that the image indicator field of the first record indicates that an image in the set of images is associated with the first transaction and that the image indicator field of the second record indicates that an image is associated with the second transaction; and
      send a response to the client device in response to receiving the request from the client device, the processor sending the response prior to the end of the current day, the response containing information that identifies a location of the first image archive and a location of the first image within the first image archive, the response containing information that identifies a location of the second image archive and a location of the second image within the second image archive, the first image associated with the first transaction, the second image associated with the second transaction, the client device and the processor communicating using HTTP and TCP/IP as a transport protocol for the response, the client device being remote from the image archives.

15. The system of claim 14, wherein the first image archive is not owned by an owner of the system and the second image archive is owned by the owner of the system.

16. The system of claim 14,
   wherein the first transaction is a payment transaction; and
   wherein the first image is a payment image.

17. The system of claim 14, wherein the first image is a transaction processing image.

18. The system of claim 14, wherein the first image is a file folder image.

19. The system of claim 18, wherein the file folder image is a loan document.

20. The system of claim 14, wherein the processor returns, in response to the search request, an expected time to retrieve the first image.

21. The system of claim 14, further comprising security services that enable the customer to send the search request to the processor.

22. A non-transitory computer-readable medium comprising instructions that, when executed by a computer, cause the computer to:
   store a set of images in a set of image archives, the set of image archives including at least a first image archive and a second image archive, the set of images including at least a first image and a second image, the first image archive storing the first image digitally, the second image archive storing the second image on microfilm, the first image archive and the second image archive being geographically distributed, the first image archive owned by an owner of the computer, the second image archive not owned by the owner of the computer;
   store, at a digital repository, a master system of record for a financial institution, the master system of record containing records, the records recording financial transactions in a set of financial transactions, the digital repository storing the records for a predetermined amount of time, the financial transactions including at least a first transaction, a second transaction, a third transaction, and a fourth transaction, the records including a first record, a second record, a third record, and a fourth record, the first record recording the first transaction the second record recording the second transaction, the third record recording the third transaction, the fourth record recording the fourth transaction,
      wherein the master system of record includes a captured item table that includes records of the financial transactions that occurred prior to the current day;
      wherein the master system of record includes a hub captured item table that stores records of the financial transactions that occurred on the current day at a hub, the hub being a check processing center;
      wherein the first record, the second record, and the third record have image indicator fields, the image indicator field of the first record indicating that an image in the set of images is associated with the first transaction, the image indicator field of the second record indicating that an image in the set of images is associated with the second transaction, the image indicator field of the third record indicating that no image is associated with the third transaction, the image indicator field of the fourth record indicating that an image in the set of images is associated with the fourth transaction;

wherein the first record is available in the master system of record at a time the hub captures monetary items for a period during a current day, the monetary items including a check associated with the first transaction;

receive a search request from a client device before an end of the current day, the client device associated with a customer of the financial institution, the client device and the computing apparatus communicating using HTTP and TCP/IP as a transport protocol for the search request, the search request specifying a first set of information, the first set of information identifying the first transaction and the second transaction;

in response to receiving the search request, use the first set of information to identify the first record and the second record;

determine, in response to receiving the search request, whether the captured item table includes the first record;

retrieve the first record from the hub captured item table after determining that the captured item table does not include the first record;

after identifying the first record and the second record, determine that the image indicator field of the first record indicates that an image in the set of images is associated with the first transaction and that the image indicator field of the second record indicates that an image in the set of images is associated with the second transaction; and send a response to the client device before the end of the current day, the computer sending the response in response to receiving the request from the client device, the response containing information that identifies a location of the first image archive and a location of the first image within the first image archive, the response containing information that identifies a location of the second image archive and a location of the second image within the second image archive, the first image associated with the first transaction, the second image associated with the second transaction, the client device and the computer communicating using HTTP and TCP/IP as a transport protocol for the response, the client device being remote from the image archives;

receive an image exception file that specifies the fourth record; and update the fourth record in response to receiving the image exception file, the computer updating the fourth record to indicate that no image is associated with the fourth transaction.

* * * * *